United States Patent
Lyon et al.

(10) Patent No.: US 9,986,023 B1
(45) Date of Patent: May 29, 2018

(54) VIRTUAL DATA STORAGE APPLIANCE WITH PLATFORM DETECTION BY USE OF VM-ACCESSIBLE RECORD

(71) Applicant: EMC IP Holding Company LLC, Hopkinton, MA (US)

(72) Inventors: Jared C. Lyon, Brighton, MA (US); Yuri A. Stotski, Saint Petersburg (RU); Michael L. Burriss, Raleigh, NC (US)

(73) Assignee: EMC IP Holding Company LLC, Hopkinton, MA (US)

( * ) Notice: Subject to any disclaimer, the term of this patent is extended or adjusted under 35 U.S.C. 154(b) by 148 days.

(21) Appl. No.: 15/188,689

(22) Filed: Jun. 21, 2016

(51) Int. Cl.
*H04L 29/08* (2006.01)
*H04L 12/911* (2013.01)
*G06F 9/455* (2018.01)
*H04L 12/931* (2013.01)

(52) U.S. Cl.
CPC .......... *H04L 67/10* (2013.01); *G06F 9/45533* (2013.01); *G06F 9/45558* (2013.01); *H04L 47/78* (2013.01); *H04L 49/70* (2013.01)

(58) Field of Classification Search
CPC ... H04L 49/70; G06F 9/45558; G06F 9/45533
See application file for complete search history.

(56) References Cited

U.S. PATENT DOCUMENTS

| | | | |
|---|---|---|---|
| 8,839,241 B2 | 9/2014 | LeMahieu et al. | |
| 8,910,157 B2 | 12/2014 | Ciano et al. | |
| 9,766,912 B1 * | 9/2017 | Jorgensen | G06F 9/45533 |
| 2007/0288224 A1 * | 12/2007 | Sundarrajan | G06F 9/5072 703/22 |
| 2009/0222560 A1 | 9/2009 | Gopisetty et al. | |
| 2011/0004676 A1 | 1/2011 | Kawato | |
| 2011/0153798 A1 * | 6/2011 | Groenendaal | H04L 63/20 709/223 |
| 2012/0254567 A1 * | 10/2012 | Umbehocker | G06F 3/0604 711/162 |
| 2014/0032920 A1 * | 1/2014 | Gehrmann | G06F 21/57 713/176 |
| 2014/0351809 A1 * | 11/2014 | Chawla | G06F 9/45533 718/1 |
| 2017/0242718 A1 * | 8/2017 | Usgaonkar | G06F 9/45533 |
| 2017/0277524 A1 * | 9/2017 | Bhat | G06F 8/60 |

* cited by examiner

*Primary Examiner* — Lashonda Jacobs
(74) *Attorney, Agent, or Firm* — BainwoodHuang

(57) ABSTRACT

A method of establishing a platform-specific configuration of a virtual machine functioning as a virtual storage appliance includes, in a deployment operation, creating a virtual platform on host computer(s), the virtual platform being a collection of virtualized hardware resources having a selected configuration from among multiple possible configurations. A description of the selected configuration of the virtual platform is stored in a record accessible to the virtual machines during a later virtual-machine initialization process. The virtual machines are instantiated and their operation initiated, and the virtual machines perform the virtual-machine initialization process to (1) read the record to obtain the stored description of the selected configuration of the virtual platform and (2) use the description of the selected configuration of the virtual platform to self-configure into the platform-specific configuration for operation compatible with the virtual platform.

20 Claims, 5 Drawing Sheets

VIRTUAL DATA STORAGE APPLIANCE WITH PLATFORM DETECTION BY USE OF VM-ACCESSIBLE RECORD

BACKGROUND

The present invention is related to the field of data storage systems.

Data storage systems have long been specialized, purpose-built hardware devices specifically tailored for providing secondary storage to separate host computer systems. Common examples include (1) an integrated cached disk array (ICDA), which includes an array of physical disk drives, semiconductor storage cache, and storage processors interfacing to the host computers using storage-oriented protocols, and (2) network-attached storage or NAS, which has generally similar structure while providing a network-oriented connection (e.g., TCP-IP) and typically a distributed file system (e.g., CIFS) interface to the hosts.

There is an industry trend toward so-called software-defined storage, in which data storage is provided by specialized software-implemented (or "virtualized") appliances using more generic hardware. In some cases, a virtualized storage appliance may execute substantially the same software image as a corresponding purpose-built storage system, with modification as necessary to accommodate the generic underlying hardware substituted for the more specialized purpose-built hardware.

SUMMARY

One of the needs in a data storage system, which is also referred to as a storage "appliance" herein, is for operating software to detect specific aspects of the execution environment including hardware parameters. This information can be used for the related purposes of (1) determining whether a configuration of the environment is compatible with the requirements of the operating software, and (2) configuring the operating software as necessary for correct operation with the detected environment. For example, when the hardware provides a certain amount of physical memory, the operating software must be configured to expect no more than that amount of physical memory to be available. When the data storage system is purpose-built, the manufacturer has great control over the configuration of the hardware, and operating software can either assume proper configuration or easily detect distinct configurations and self-configure accordingly.

As an example, one approach is for the operating software to detect information regarding PCI hardware (Vendor ID, Product ID, etc.), memory size, and network adapter count. However, this approach can be problematic in virtualized storage appliances, as the virtualized hardware (e.g., virtualized PCI components) may not be unique between platforms. It also may require predetermination of memory sizes and network adapter counts, reducing flexibility in deploying different configurations in the future.

Thus, it would be beneficial to have a more flexible and customizable technique of communicating platform configuration information to the operating software of a virtual storage appliance, avoiding the drawbacks of prior approaches and achieving associated benefits. More specifically, it would be desirable to have a mechanism for explicitly defining a platform type and other configuration information while removing any dependency on memory size and network adapter count, for example. This would allow for a more dynamic configuration of the virtualized hardware, as the platform detection no longer depends on a very specific hardware configuration.

Thus a method is disclosed of establishing a platform-specific configuration of one or more virtual machines functioning as a virtual storage appliance using resources of a virtual platform. The method includes, in a deployment operation for instantiating the virtual storage appliance, creating the virtual platform on one or more interconnected host computers. The virtual platform is a collection of virtualized hardware resources having a selected configuration from among multiple possible configurations. Also in the deployment operation, a description is stored of the selected configuration of the virtual platform in a record accessible to the virtual machines during a later virtual-machine initialization process. Finally, the virtual machines are instantiated and their operation initiated, and the virtual machines perform the virtual-machine initialization process to (1) read the record to obtain the stored description of the selected configuration of the virtual platform and (2) use the description of the selected configuration of the virtual platform to self-configure into the platform-specific configuration for operation compatible with the virtual platform.

The disclosed method avoids the limitations of prior approaches by explicitly signaling configuration information to the virtual machines for use during their initialization, effectively decoupling the platform detection from any specific hardware requirements. This provides much greater flexibility in deploying virtual storage appliances using a variety of virtual platform configurations on generic hardware, as is needed in virtualized systems.

In one embodiment, the record includes one of a set of abstract identifiers mapped to respective ones of the possible configurations, the one abstract identifier being mapped to the selected configuration. The abstract identifiers may be referred to as an "asset tag" and identify a given configuration as a corresponding "model" of the virtual storage appliance. In this case the virtual machines may have access to a mapping structure, such as a table, that maps the abstract identifiers to respective sets of specific values for respective ones of the virtualized hardware resources, and the virtual-machine initialization process uses the abstract identifier of the record to look up a respective set of specific values as the selected configuration.

In one embodiment, the deployment operation includes (1) obtaining a user-created description of the selected configuration from a separate record not accessible to the virtual machines, and (2) using the user-created description of the selected configuration to create the description of the selected configuration for storing in the record to communicate the selected configuration to the virtual machines. The separate record may be one or more configuration files stored on a system device of a system manager computer, which interfaces with a system user to create the user-created description of the selected configuration and to initiate and control the deployment operation for instantiating the virtual storage appliance.

In one embodiment, the virtual storage appliance includes two or more virtual machines implementing respective storage processors, and the virtual platform includes an inter-SP connection via which the storage processors inter-communicate. The virtual platform and virtual machines may be located entirely on one of the host computers, or alternatively they may be distributed across two or more of the host computers, with the inter-SP connection provided in part by a hardware communications switch interconnecting the host computers.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

DETAILED DESCRIPTION

Figure 1:
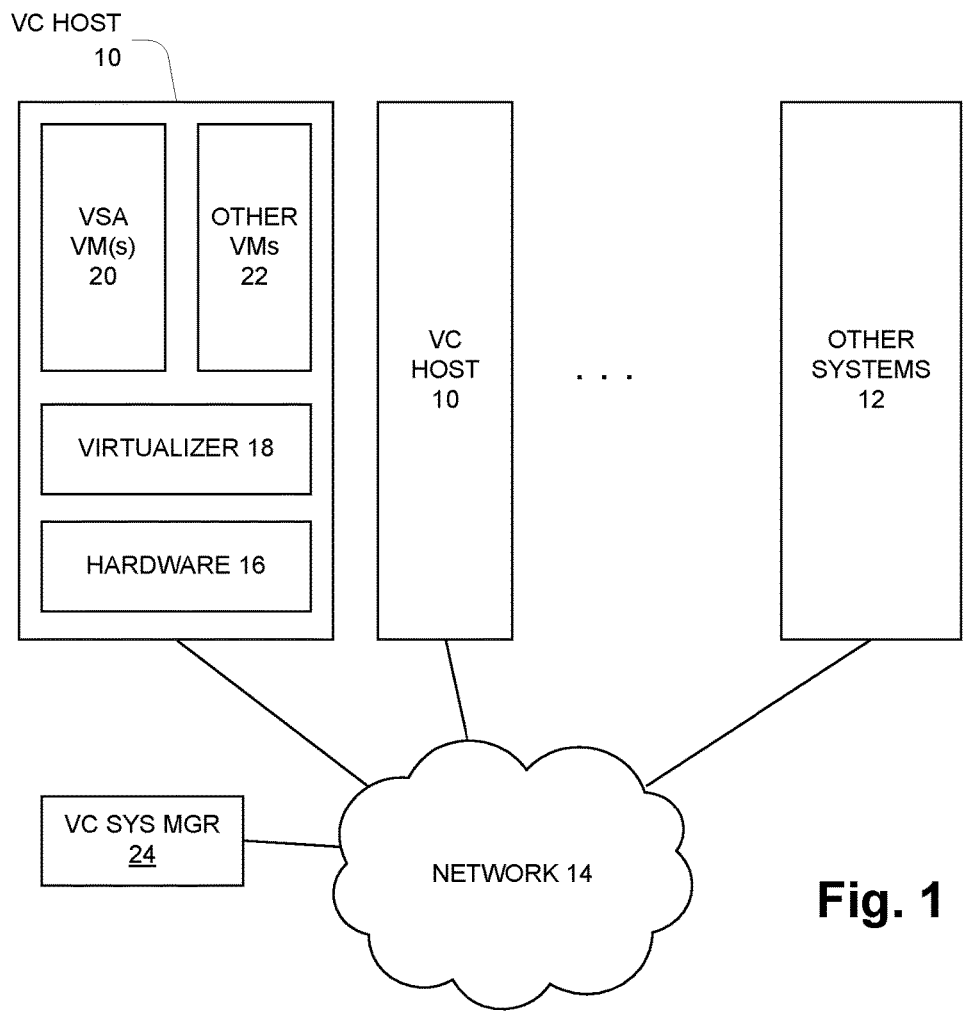
FIG. 1 is a block diagram of a computer system.

FIG. 1 shows a computing system including specialized host computers shown as virtual computing (VC) hosts 10 and other systems 12 interconnected by a network 14. As shown, a VC host 10 includes hardware 16 (such as processors, memory, interface circuitry, etc.), and software-implemented components including a virtualizer 18 and virtual machines (VMs) shown as virtual storage appliance (VSA) VMs 20 and other VMs 22. The other VMs 22 may include additional VSA VMs 20, and/or VMs configured for other dedicated or general purposes, such as network appliances, specialized application servers such as database servers, etc. The other systems 12, when present, may include specialized components such as data storage systems, network devices, application-specific components for supporting specific deployments, etc. The VSA VMs 20 provide storage services to applications executing on either the same VC hosts 10 or other hosts (not shown).

The virtualizer 18 of the VC host 10 provides an operating environment presenting abstracted or "virtual" resources to the VMs 20, 22 using real resources of the hardware 16 and other physical system components such as network 14 and other systems 12. In one class of VC host 10, the virtualizer 18 is realized using a type I hypervisor, which is generally understood as interfacing directly with the hardware 16 without intermediation by a separate host operating system. Other classes of VC hosts 10 employ other configurations.

A VSA including one or more VSA VMs 20 is a software-implemented data storage appliance, analogous to conventional standalone hardware storage appliances such as network attached storage (NAS) boxes, integrated cached disk arrays (ICDAs), etc. In one type of embodiment, a VSA is implemented using a software image also usable to realize such dedicated hardware storage appliances, which is referred to herein as the "dedicated" or "purpose-built" environment in contrast to the "virtual" or "general-purpose" environment that is the primary subject of this description. A VSA uses underlying storage resources to present value-added storage-related services to applications executing in a data processing system. Value-added services can cover a broad range including RAID, data deduplication, compression, clustering and failover, etc. Thus a VSA is a consumer of lower-level storage resources such as plain virtual disks, and a provider of higher-level storage resources to applications executing in the system.

Physical data storage needs of the system are generally provided by some combination of so-called "direct attached" storage at the VC hosts 10 and network-accessed storage such as purpose-built storage appliances (NAS, ICDAs, etc.) that may be included in other systems 12. In particular, the virtualizer 18 is responsible for understanding the physical storage resources available in the system and using the storage resources to provide virtual storage to the VSA VMs 20.

Also shown in FIG. 1 is a VC system manager (VC SYS MGR) 24, which is a collection of one or more computers executing special system-management software for managing the virtual-computing system including the VC hosts 10, virtualizers 18 and individual VMs 20, 22. In operation, the VC system manager 24 responds to actions of a system management user to accomplish tasks such as creating or "deploying" new VMs 20, 22, which includes assigning virtualized resources backed by corresponding physical resources, configuring network connections and related parameters, etc. In particular, the VC system manager 24 plays a part in enabling the processors of VSA VMs 20 to detect characteristics of a virtual platform of the respective VSAs, both to ensure compatibility and to enable the VMs 20 to self-configure accordingly. These operations and certain related structure are described more below.

Figure 2:
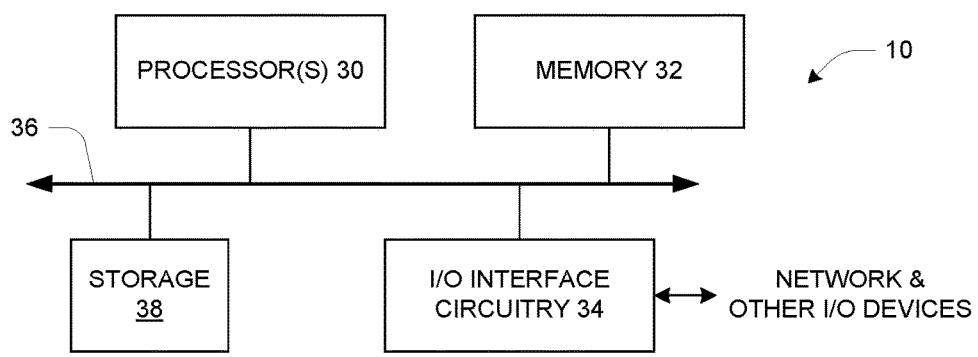
FIG. 2 is a hardware-oriented block diagram of a computer.

FIG. 2 shows an example configuration of a VC host 10 from a computer hardware perspective. The hardware includes one or more processors 30, memory 32, and interface circuitry 34 interconnected by data interconnections 36 such as one or more high-speed data buses. The interface circuitry 34 provides a hardware connection to the network 14 (FIG. 1) and perhaps other external devices/connections (EXT DEVs). The processor(s) 30 with connected memory 32 may also be referred to as "processing circuitry" herein. There may also be local or direct-attached storage 38 such as local-attached disk drives or Flash drives. In operation, the memory 32 stores data and instructions of system software (e.g., operating system, hypervisor, etc.) and one or more application programs which are executed by the processor(s) 30 to cause the hardware to function in a software-defined manner.

Figure 3:
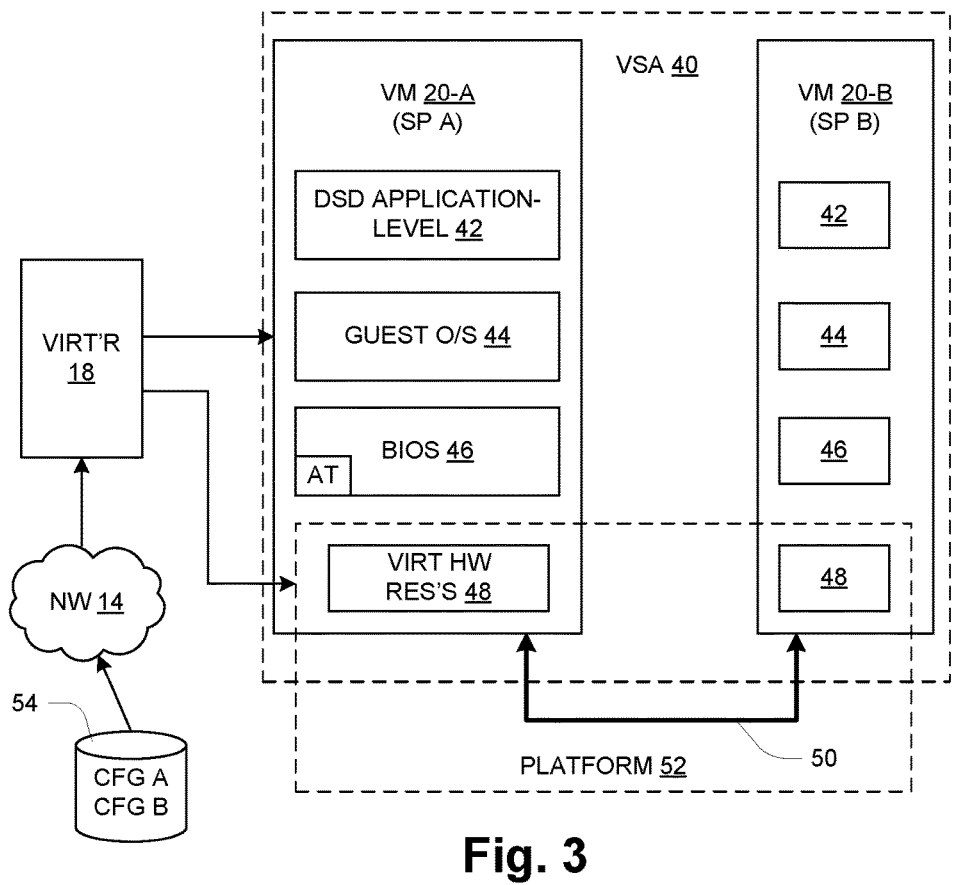
FIG. 3 is a block diagram of a virtual storage appliance (VSA)

FIG. 3 shows structure related to a VSA 40. In the illustrated example it includes two VSA VMs 20, shown as VM 20-A and 20-B. These embody certain data storage processing functionality and thus are also referred to herein as respective "storage processors" or SPs, indicated as SP A and SP B. Each SP includes data storage device (DSD) application-level components 42, a guest operating system (O/S) 44, and a basic I/O system (BIOS) 46. The BIOS 46 includes a record shown as an asset tag AT, described below. Each SP also includes respective virtualized hardware (HW) resources 48 as noted above, i.e., virtual hardware resources made available to the VM 20 by the virtualizer 18 using a combination if its real hardware resources 16. The virtualized hardware resources 48 of the VMs 20 along with a set of dedicated inter-SP connections 50 are referred to as the "platform" 52 on which the higher-level components (such as DSD application level 42) execute. The platform 52 is analogous to the set of hardware components and resources in a purpose-built data storage device.

The inter-SP connections 50 include multiple distinct interfaces for respective inter-SP communications or functions, including for example heartbeat (split brain avoidance) and high-availability (HA) connections to guard against single point of failure. In general, the inter-SP connections 50 are provided using facilities of the virtualizer 18 for providing networking, i.e., a virtual switch. In the case that the platform 52 resides completely within one VC host 10, the virtual switch also resides within that VC host 10 and uses its hardware resources. An alternative arrangement is described below in which the VSA 40 and platform 52 extend across multiple VC hosts 10, in which case the virtual switch becomes distributed and relies in part on a separate physical switch interconnecting the VC hosts 10.

Also shown in FIG. 3 is the virtualizer 18 having connections into the VMs 20 and the platform 52, along with a connection to the network 14. Attached to the network 14 is a system storage device 54 that includes configuration files CFG A, CFG B containing respective sets of configuration information for SP A and SP B. The system storage device 54 is accessible to and used by the virtualizer 18 in connection with deploying and operating the VMs 20. The system storage device 54 may be distinct from other storage devices used to provide underlying storage for virtual storage devices presented to the VMs 20 for use thereby.

Figure 4:
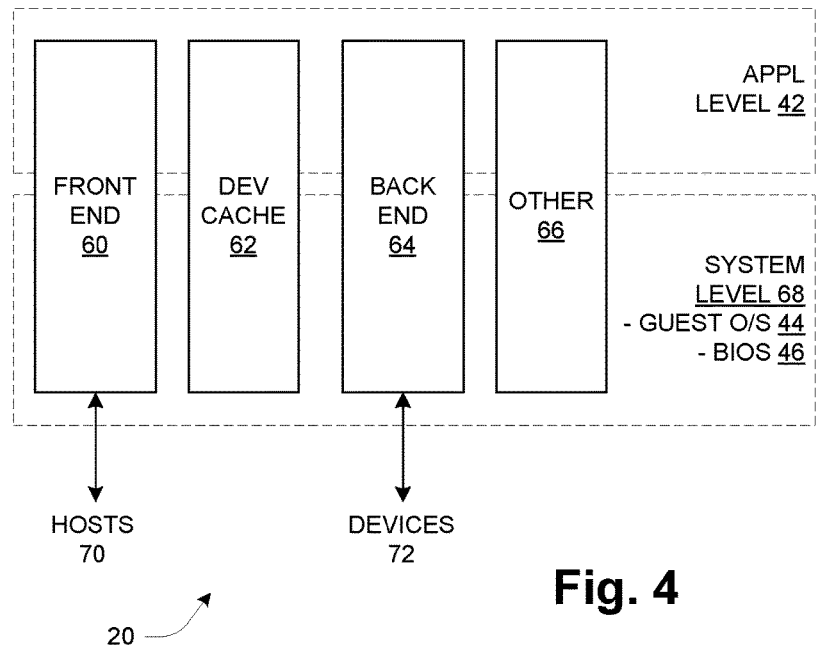
FIG. 4 is a block diagram of a storage processor.

The following is a short listing of example configuration information that could be included in the configuration files:
1. SP ID (SP A, SP B, etc.)
2. Hypervisor type (ESX, KVM, etc.)
3. Expected memory size
4. Model number
5. Model name
6. Other information that can be represented in plain text FIG. 4 shows another view of SP organization, with functionality pertaining to different aspects of processing storage requests from hosts. An SP includes a variety of software-implemented components shown as a front end 60, device cache 62, back end 64, and other 66. These components collectively provide the above-described value-added storage functionality of the VSA 40. Each component has sub-components or modules divided between DSD application level 42 and system level 68, which refers to the local operating environment provided by the guest O/S 44 and BIOS 46 for example.

Generally, the front end 60 provides functionality for desired interface(s) to host applications (HOSTS) 70, and may support a block-based communications protocol such as iSCSI or a NAS protocol such as CIFS. It may also implement virtual-storage oriented protocols. The front end 60 uses internal mechanisms to realize the underlying storage functionality. One of the internal mechanisms may be the device cache 62, which caches data of underlying storage devices accessed via the back end 64 to make the data more quickly available, increasing performance. The back end 64 interfaces to the storage resources, such as virtual disks, provided by the virtualizer 18. These storage resources are shown as "devices" 72 in FIG. 4. The other components 66 include things like management and service components, general O/S components or libraries, and utilities.

Referring again to FIG. 3, the illustrated structure of a VSA 40 can be realized on one or more VC hosts 10. In the case of a single-host implementation, the two VMs 20-A, 20-B both execute on a VC host 10, and the inter-SP connections 50 can be realized using a standard virtual switch executing on the same VC host 10. It should also be noted at this point that a VSA 40 may be realized using only one SP rather than a pair SP A, SP B as illustrated. In that case, the platform 52 need not provide the inter-SP connections 50, and related functionality of the SPs is generally disabled. These two distinct configurations may be referred to as "single node" and "dual node" respectively.

As noted above, the disclosed method allows for explicit detection of a platform type in a virtual platform environment where the underlying hardware (e.g., hardware 16) is often identical across physical machines (e.g., VC hosts 10). Through use of the BIOS asset tag AT (or other unique identifier, such as a SKU number) in the VM configuration file (CFG A, CFG B), a platform identification string can be passed from the virtualizer 18 to the guest O/S 44 and DSD application-level components 42. This tag is unique for each configuration of virtual platform 52. It identifies internal platform type (e.g., an ESX environment versus others), a hypervisor type, a node count (single or dual SP) and, for a dual-SP configuration, the node identity (SP A vs. SP B). Using this detection system a VSA 40 is able to automatically initialize using the correct configuration.

Figure 5:
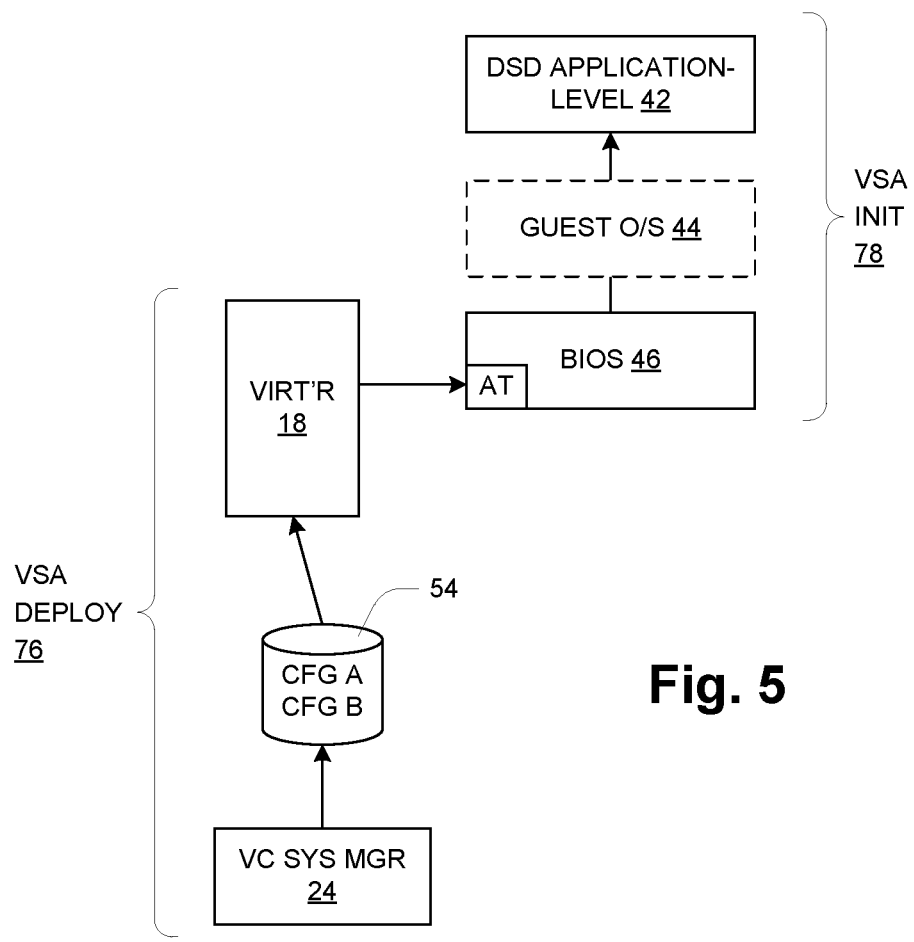
FIG. 5 is a schematic depiction of communication of configuration information among system elements.

FIG. 5 illustrates a general flow of configuration information in the system. Actions occur in either of two phases of operation including a VSA deployment operation 76 and a VSA initialization (INIT) operation 78. During the VSA deployment 76, the VC system manager 24 creates the VMs 20 of the VSA 40. Various aspects of configuration are defined, as outlined above, either by default or by action of an administrative user in a user interface of the VC system manager 24, and resulting configuration information for the VMs 20-A, 20-B is stored in respective configuration files CFG A, CFG B of the system storage device 54. The virtualizer 18 accesses these files to obtain the configuration information, and inserts a corresponding asset tag AT into the BIOS 46 of each VM 20-A, 20-B prior to launching either VM for the first time. The asset tag AT is an abstract identifier that is mapped to corresponding distinct configurations by a table or similar data structure, as described more below.

During VSA initialization 78, the guest O/S 44 of each VM 20 reads the AT of its BIOS 46 to obtain the platform configuration information, for use in self-configuring the VM 20. As noted, in one embodiment the asset tag is an abstract identifier mapped to corresponding configurations by a table or similar data structure, which may be stored in the BIOS 46 or the guest O/S 44 for example. Following the analogy to the purpose-built systems, asset tags may be structured as model identifiers, i.e., names or numbers from a list of distinct types, or "models", of a data storage system, and the mapping table maps such a list of model identifiers to corresponding internal configurations that define or otherwise belong to the respective models.

Below is a simplified example of such a table or other data structure.

| # | Asset Tag (Model) | Configuration | | | |
|---|---|---|---|---|---|
| | | Nodes | Memory (GB) | NW Intfc | ... |
| 1 | 0001 | 2 | 8 | 4 | ... |
| 2 | 0002 | 2 | 8 | 5 | ... |
| 3 | 0003 | 2 | 16 | 4 | ... |
| ... | ... | ... | ... | ... | ... |

Figure 6:
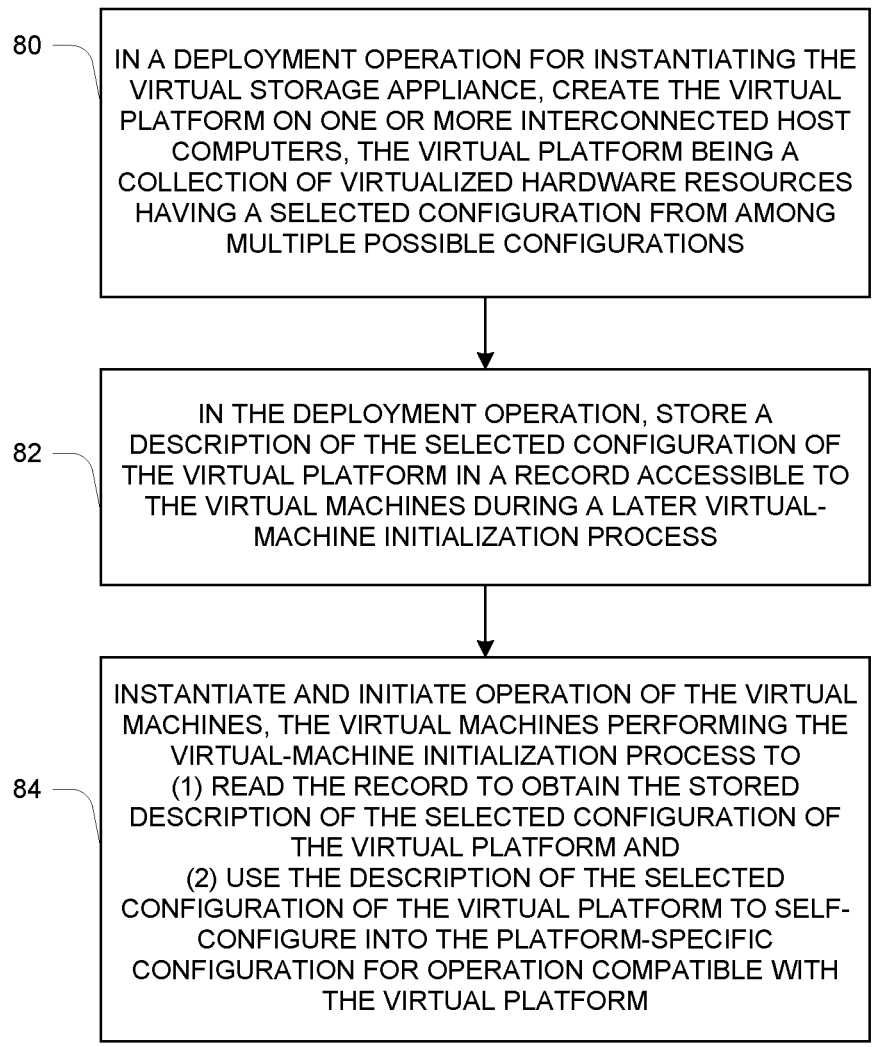
FIG. 6 is a flow diagram of communication of configuration information among system elements.

FIG. 6 illustrates certain high-level functionality of the system in connection with beginning operation of a VSA 20. Steps 80 and 82 are part of a deployment operation for instantiating the VSA 20. The deployment operation may involve use of a wizard or similar tool of the VC system manager 24 that automates much of the detail of creating and configuring VMs 20, with provision for user input for selectable aspects of configuration.

At 80, a virtual platform (e.g., platform 52) is created on one or more interconnected host computers (e.g., VC hosts 10), the virtual platform being a collection of virtualized hardware resources (e.g., resources 48) having a selected configuration from among multiple possible configurations. As noted above, the configurations relate to things like the amount of physical memory, the number of network interfaces, the number and speed of the CPUs, the configuration of physical storage devices, etc.

At 82, as part of the deployment operation, a description of the selected configuration of the virtual platform is stored in a record (e.g., an asset tag AT stored in BIOS 46) accessible to the virtual machines during a later virtual-machine initialization process.

At 84, the virtual machines are instantiated and their operation initiated. At this time, the virtual machines perform the virtual-machine initialization process to (1) read the record to obtain the stored description of the selected configuration of the virtual platform and (2) use the description of the selected configuration of the virtual platform to self-configure into a platform-specific configuration for operation compatible with the virtual platform.

An SP uses the configuration information to start specific drivers/services that apply to the platform described by the configuration information. An SP may also use the configuration information to set system limits appropriately (max number of LUNs, max number of storage pools, max size of storage pools, etc.), because those may differ from platform to platform.

Another aspect of communicating the configuration to the VM in the illustrated manner is to enable the VM to confirm that the platform 52 is configured as it should be. For example, a given asset tag AT may indicate that the VM is configured with 8 GB of physical memory, and a VM 20 can check with the guest O/S 44 to confirm this amount. If the configuration process actually assigned some other amount of memory, e.g., 4 GB, to the VM 20, the guest O/S 44 will report this actual amount and the VM 20 can detect the discrepancy. Remedial action may then be taken.

Figure 7:
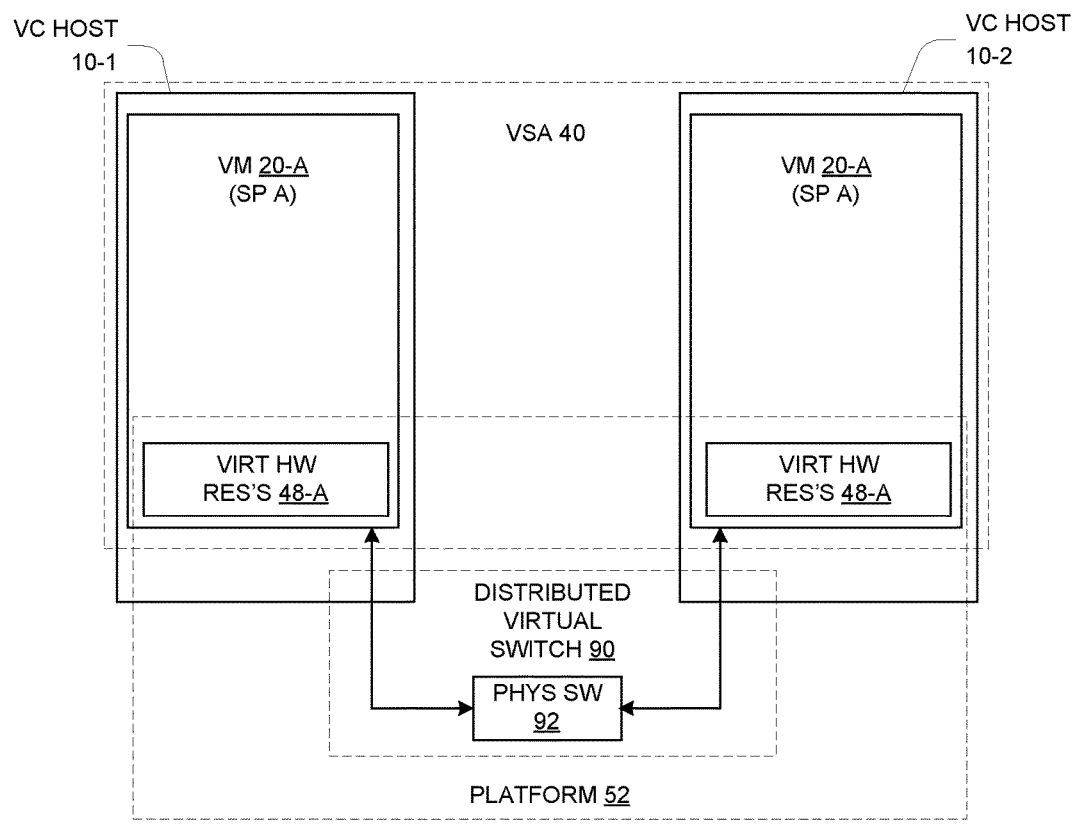
FIG. 7 is a block diagram of a VSA according to another embodiment.

FIG. 7 shows an alternative to a single-host implementation, namely an implementation having SP A and SP B of a VSA 40 residing on respective distinct VC hosts 10-1, 10-2. In this case the inter-SP connection is realized using a distributed virtual switch 90, which includes a physical switch 92 connecting the two hosts 10-1, 10-2 and corresponding virtual-switch functionality of the virtualizer 18 in each VC host 10 as described above in connection with FIG. 3.

While various embodiments of the invention have been particularly shown and described, it will be understood by those skilled in the art that various changes in form and details may be made therein without departing from the spirit and scope of the invention as defined by the appended claims.

What is claimed is:

1. A method of establishing a platform-specific configuration of one or more virtual machines functioning as a virtual storage appliance using resources of a virtual platform, comprising:
   in a deployment operation for instantiating the virtual storage appliance, creating the virtual platform on one or more interconnected host computers, the virtual platform being a collection of virtualized hardware resources having a selected configuration from among multiple possible configurations;
   in the deployment operation, storing a description of the selected configuration of the virtual platform in a record accessible to the virtual machines during a later virtual-machine initialization process; and
   instantiating and initiating operation of the virtual machines, the virtual machines performing the virtual-machine initialization process to (1) read the record to obtain the stored description of the selected configuration of the virtual platform and (2) use the description of the selected configuration of the virtual platform to self-configure into the platform-specific configuration for operation compatible with the virtual platform.

2. The method of claim 1, wherein the record includes one of a set of abstract identifiers mapped to respective ones of the possible configurations, the one abstract identifier being mapped to the selected configuration.

3. The method of claim 2, wherein the virtual machines have access to a mapping structure that maps the abstract identifiers to respective sets of specific values for respective ones of the virtualized hardware resources, and wherein the virtual-machine initialization process uses the abstract identifier of the record to look up a respective set of specific values as the selected configuration.

4. The method of claim 1, further including, in the deployment operation, (1) obtaining a user-created description of the selected configuration from a separate record not accessible to the virtual machines, and (2) using the user-created description of the selected configuration to create the description of the selected configuration for storing in the record to communicate the selected configuration to the virtual machines.

5. The method of claim 4, wherein the separate record is one or more configuration files stored on a system device of a system manager computer, the system manager computer interfacing with a system user to create the user-created description of the selected configuration and to initiate and control the deployment operation for instantiating the virtual storage appliance.

6. The method of claim 1, wherein the virtual storage appliance includes two or more virtual machines implementing respective storage processors, and wherein the virtual platform includes a set of inter-SP connections via which the storage processors inter-communicate.

7. The method of claim 6, wherein the virtual platform and virtual machines are located entirely on one of the host computers.

8. The method of claim 6, wherein the virtual platform and virtual machines are distributed across two or more of the host computers, and the inter-SP connections are provided in part by a hardware communications switch interconnecting the host computers and in part by virtual switching communication provided by a hypervisor using underlying hardware communications.

9. A non-transitory computer-readable medium storing computer program instructions of a storage processor of a virtual storage appliance, the computer program instructions being executable by a host computer to cause the host computer to perform a method of establishing a platform-specific configuration of a virtual machine realizing the storage processor and using resources of a virtual platform on the host computer, the virtual platform being a collection of virtualized hardware resources having a selected configuration from among multiple possible configurations, the method including a virtual-machine initialization process performed upon instantiation and initiation of operation of the virtual machine, including:
   reading a record to obtain a stored description of a selected configuration of the virtual platform, the description being stored in the record during a preceding deployment operation for deploying the virtual storage appliance; and using the description of the selected configuration of the virtual platform to self-configure into the platform-specific configuration for operation compatible with the virtual platform.

10. The non-transitory computer-readable medium of claim 9, wherein the record includes one of a set of abstract identifiers mapped to respective ones of the possible configurations, the one abstract identifier being mapped to the selected configuration.

11. The non-transitory computer-readable medium of claim 10, wherein the virtual machines have access to a mapping structure that maps the abstract identifiers to respective sets of specific values for respective ones of the virtualized hardware resources, and wherein the virtual-machine initialization process uses the abstract identifier of the record to look up a respective set of specific values as the selected configuration.

12. The non-transitory computer-readable medium of claim 9, wherein the preceding deployment operation includes (1) obtaining a user-created description of the selected configuration from a separate record not accessible to the virtual machines, and (2) using the user-created description of the selected configuration to create the description of the selected configuration for storing in the record to communicate the selected configuration to the virtual machine.

13. The non-transitory computer-readable medium of claim 12, wherein the separate record is one or more configuration files stored on a system device of a system manager computer, the system manager computer interfacing with a system user to create the user-created description of the selected configuration and to initiate and control the deployment operation for instantiating the virtual storage appliance.

14. The non-transitory computer-readable medium of claim 9, wherein the virtual storage appliance includes two or more virtual machines implementing respective storage processors, and wherein the virtual platform includes a set of inter-SP connections via which the storage processors inter-communicate.

15. The non-transitory computer-readable medium of claim 14, wherein the virtual platform and virtual machines are located entirely on one of the host computers.

16. The non-transitory computer-readable medium of claim 14, wherein the virtual platform and virtual machines are distributed across two or more of the host computers, and the inter-SP connections are provided in part by a hardware communications switch interconnecting the host computers and in part by virtual switching communication provided by a hypervisor using underlying hardware communications.

17. A computer system, comprising:
one or more interconnected host computers; and
a system manager computer coupled to the host computers,
the host computers and system manager being co-operative to establish a platform-specific configuration of one or more virtual machines functioning as a virtual storage appliance using resources of a virtual platform, including:
(1) in a deployment operation for instantiating the virtual storage appliance, creating the virtual platform on one or more interconnected host computers, the virtual platform being a collection of virtualized hardware resources having a selected configuration from among multiple possible configurations;
(2) in the deployment operation, storing a description of the selected configuration of the virtual platform in a record accessible to the virtual machines during a later virtual-machine initialization process; and
(3) instantiating and initiating operation of the virtual machines, the virtual machines performing the virtual-machine initialization process to (1) read the record to obtain the stored description of the selected configuration of the virtual platform and (2) use the description of the selected configuration of the virtual platform to self-configure into the platform-specific configuration for operation compatible with the virtual platform.

18. The computer system of claim 17, wherein the deployment operation further includes (1) obtaining a user-created description of the selected configuration from a separate record not accessible to the virtual machines, and (2) using the user-created description of the selected configuration to create the description of the selected configuration for storing in the record to communicate the selected configuration to the virtual machines, the separate record being one or more configuration files stored on a system device of the system manager computer, the system manager computer interfacing with a system user to create the user-created description of the selected configuration and to initiate and control the deployment operation for instantiating the virtual storage appliance.

19. The computer system of claim 17, wherein the virtual storage appliance includes two or more virtual machines implementing respective storage processors, and wherein the virtual platform includes a set of inter-SP connections via which the storage processors inter-communicate.

20. The computer system of claim 19, wherein the virtual platform and virtual machines are distributed across two or more of the host computers, and the inter-SP connections are provided in part by a hardware communications switch interconnecting the host computers and in part by virtual switching communication provided by a hypervisor using underlying hardware communications.

* * * * *